United States Patent [19]
Kimura

[11] Patent Number: 5,374,994
[45] Date of Patent: Dec. 20, 1994

[54] INPUT/OUTPUT SWITCHING CIRCUIT FOR CONNECTING AUDIO/VIDEO UNITS

[75] Inventor: Naoki Kimura, Kanagawa, Japan

[73] Assignee: Kabushiki Kaisha Toshiba, Kanagawa, Japan

[21] Appl. No.: 118,781

[22] Filed: Sep. 10, 1993

Related U.S. Application Data

[63] Continuation of Ser. No. 497,192, Mar. 22, 1990, abandoned.

[30] Foreign Application Priority Data

Mar. 31, 1989 [JP] Japan .................. 1-081962

[51] Int. Cl.$^5$ .................. H04N 5/76; H04N 5/268
[52] U.S. Cl. .................. 358/335; 348/722
[58] Field of Search .................. 358/335, 194.1, 181, 358/341, 343; 360/19.1; 348/722, 16; H04N 5/76, 5/268

[56] References Cited

U.S. PATENT DOCUMENTS

| | | | |
|---|---|---|---|
| 4,496,947 | 1/1985 | Nakashima et al. | 358/194.1 |
| 4,647,973 | 3/1987 | Deis | 358/181 |
| 4,763,012 | 8/1988 | Blankinship | 358/181 |
| 4,777,503 | 10/1988 | Kramer | 358/181 |
| 4,821,032 | 4/1989 | Shimada et al. | 358/194.1 |

*Primary Examiner*—Tommy P. Chin
*Assistant Examiner*—Huy Nguyen
*Attorney, Agent, or Firm*—Finnegan, Henderson, Farabow, Garrett & Dunner

[57] ABSTRACT

An input/output switching circuit comprising a first terminal provided on a first audio/video unit, a first switch coupled to the first terminal for switching an audio/video signal at the first terminal, a second terminal provided on a second audio/video unit, a connection cable coupled between the first and second terminals for bidirectional communication of the audio/video signal between the first and second audio/video units, a second switch, coupled to the second terminal for switching the audio/video signal at the second terminal, a first microcomputer coupled to the first switch for controlling the first switch, a second microcomputer coupled to the second switch for controlling the second switch, a communication line for communicating control data between the first and second microcomputers wherein the control data includes data indicating the state of the first and second switch, such that the first and second microcomputers control the first and second switches in response to the control data to accordingly provide bidirectional communication of the audio/video signal.

8 Claims, 3 Drawing Sheets

INPUT/OUTPUT SWITCHING CIRCUIT FOR CONNECTING AUDIO/VIDEO UNITS This application is a continuation of application Ser. No. 07/497,192, filed Mar. 22, 1990, now abandoned.

FIELD OF THE INVENTION

The present invention generally relates to signal communication between apparatus, for example, an apparatus which includes a record/playback system connected to an amplifying system which selectively amplifies a number of input signals. Specifically, the present invention relates to an input/output switching circuit which connects audio and video signals between respective systems and which mutually transmits signals between, for example, an amplifying unit and record/playback unit.

BACKGROUND OF THE INVENTION

With the advances in electronic technology in recent years, the control of amplifier units (which selectively extract a number of input signals via a function switch) and tape deck units (which record or play back audio or video cassette tapes) is performed by microcomputers. Recently, for instance, the amplifier unit and the tape deck unit each have a microcomputer which recognizes the operating mode of the microcomputer in the other unit by mutual exchange of control data. One benefit of each unit having its own microcomputer is the increased processing speed that can be achieved.

FIG. 1 shows an example of a prior art input/output switching circuit in which a microcomputer is provided in each of an amplifier unit and a tape deck unit.

The amplifier unit 10 includes an amplifier control microcomputer 12 (referred to as "first microcomputer" hereafter) for selectively switching the input signals at jacks 14a through 14d. The first microcomputer 12 of the amplifier unit 10 detects and determines the current mode of tape deck unit 16 through keyswitches 12a through 12c. Tape deck unit modes include record and playback.

The tape deck unit 16 passes control signals to first microcomputer 12, through a communication line 18 connected between jacks 14e and 14f for selecting signals output through a speaker 20 via an input selector switch 22 (referred to as "input selector" hereafter). Additionally, first microcomputer 12 transmits the switching mode of the input selector 22 to tape deck unit 16 through communication line 18.

The tape deck unit 16 is provided with a tape deck control microcomputer 24 (referred to as "second microcomputer" hereafter) for controlling a tape drive mechanism (not shown) which drives a cassette tape and for executing the signal selection of a record/playback head 26. The second microcomputer 24 controls the cassette mechanism according to the mode of keyswitches 24a through 24e, and executes the selection of either recording signals to a record/playback head 26 or the playback of recorded signals. Moreover, the second microcomputer 24 detects and determines the mode of amplifier unit 10 according to control data output from the first microcomputer 12 through communication line 18.

When tape deck unit 16 is selected at the amplifier unit 10, first microcomputer 12 automatically passes the appropriate control data to the second microcomputer 24 to place tape deck unit 16 into playback mode. When another input is selected at the amplifier unit 10 microcomputers 12 and 24 automatically place tape deck unit 16 into a stop mode. Additionally, the second microcomputer 24 transmits control data to amplifier unit 10 through the communication line 18 indicating the mode of the cassette mechanism (playback, fast forward, rewind, stop, record) in tape deck unit 16.

When the input keyswitch 12a of first microcomputer 12 is closed, first microcomputer 12 closes a first switch 22a and opens second and third switches 22b and 22c of input selector 22. Since first switch 22a is closed, input audio/video signals from jack 14a are transmitted to a buffer 28. These audio/video signals are input to a preamplifier 30 from buffer 28 and subsequently output from speaker 20 via a volume controller 32 and a power amplifier 34. The output of the buffer 28 is also transmitted to tape deck unit 16 through a buffer amplifier 36 as an input signals.

The output of buffer amplifier 36 is supplied through jack 14d and input to jack 14g on tape deck unit 16 through a first connection cable 38a. The signal input to jack 14g is amplified by a recording amplifier 40 and, if tape deck unit 16 is in the recording mode, is added to a bias signal from a bias oscillator 42 and then applied as a recording signal to the record/playback head 26 via a first head circuit switch 44a which is closed. At this time, first microcomputer 12 transmits data indicating the closed state of first switch 22a and the open states of the open states of the second and third switches, 22b and 22c, to the second microcomputer 24 of tape deck unit 16 through the communication line 18.

When the keyswitch 12c of amplifier unit 10 is closed, first microcomputer 12 closes the third switch 22c of input selector 22 and opens the first and second switches, 22a and 22b. If tape deck unit 16 is in the playback mode, played-back signals from the tape are input from a jack 14h on tape deck unit 16 to jack 14c on the amplifier unit 10 through a second connection cable 38b and are passed through third switch 22c to the speaker 20. Also, first microcomputer 12 transmits data indicating the closed state of third switch 22c and the open states of first and second switches, 22a and 22b, to the second microcomputer 24.

Thus, if tape deck unit 16 is in playback mode, second microcomputer 24 places the cassette mechanism into playback mode according to data from first microcomputer 12 and inputs the played-back signals obtained from the record/playback head 26 via a second head circuit switch 44b which is closed and a playback amplifier 46 to the jack 14c. It is thus possible to play back the signals through the speaker 20.

Accordingly, during recording, signals are passed from amplifier unit 10 to tape deck unit 16 through first connection cable 38a connected between the jacks 14d and 14g, while second connection cable 38b connected between jacks 14c and 14h is not used. Conversely, during playback, signals are passed from tape deck unit 16 to amplifier unit 10 through second connection cable 38b connected between jacks 14h and 14c, while first connection cable 38a connected between jacks 14d and 14g is not used. As a result, during any operation of the prior art device shown in FIG. 1 either one of the connection cables 38a and 38b connected between amplifier unit 10 and tape deck unit 16 are not used and is, thus, wasted.

Although the above exemplary description is directed to analog audio signals, the same applies for digital audio signals from a digital audio tape recorder or to video signals from a VTR.

The prior art input/output switching circuit described above cannot operate correctly unless the respective signal lines are connected to recording amplifier 40 of tape deck unit 16 for signals from the amplifier unit 10, and to input selector 22 of amplifier unit 10 for playback signals from tape deck unit 16. In this way, a pair of connection cables for the recording input signal and the playback output signal are required between tape deck unit 16 and amplifier unit 10. Therefore, when the number of amplifier units and tape deck units is increased, the number of connection cables, large as it already is, will increase further.

SUMMARY OF THE INVENTION

It is, therefore, an object of the present invention to provide an input/output switching circuit which is designed to simplify the connection between audio/video units by providing for a unitary bidirectional communication cable which exchanges audio/video signals between an amplifier unit and a record/playback unit, specifically a tape deck unit.

The input/output switching circuit includes a first terminal provided on a first audio/video unit, a first switch coupled to the first terminal for switching an auido/video signal at the first terminal, a second terminal provided on a second audio/video unit, a connection cable coupled between the first and second terminals for bidirectional communication of the audio/video signal between the first and second audio/video units, a second switch, coupled to the second terminal for switching the audio/video signal at the second terminal, a first microcomputer coupled to the first switch for controlling the first switch, a second microcomputer coupled to the second switch for controlling the second switch, a communication line for communicating control data between the first and second microcomputers wherein the control data includes data indicating the state of the first and second switch, such that the first and second microcomputers control the first and second switches in response to the control data to accordingly provide bidirectional communication of the audio/video signal.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENT

Figure 1:
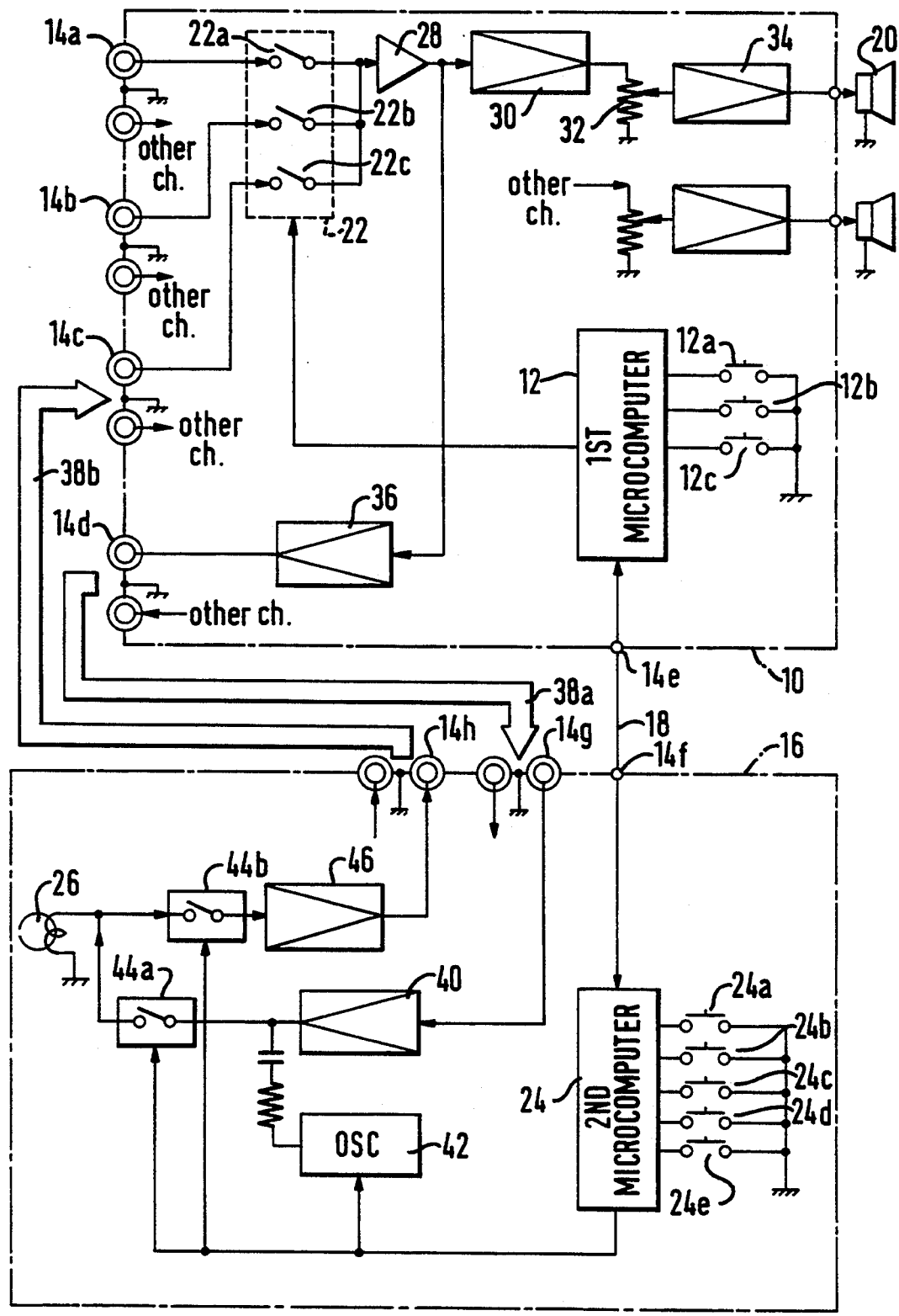
FIG. 1 is a block diagram showing a conventional input/output switching circuit.
Figure 2:
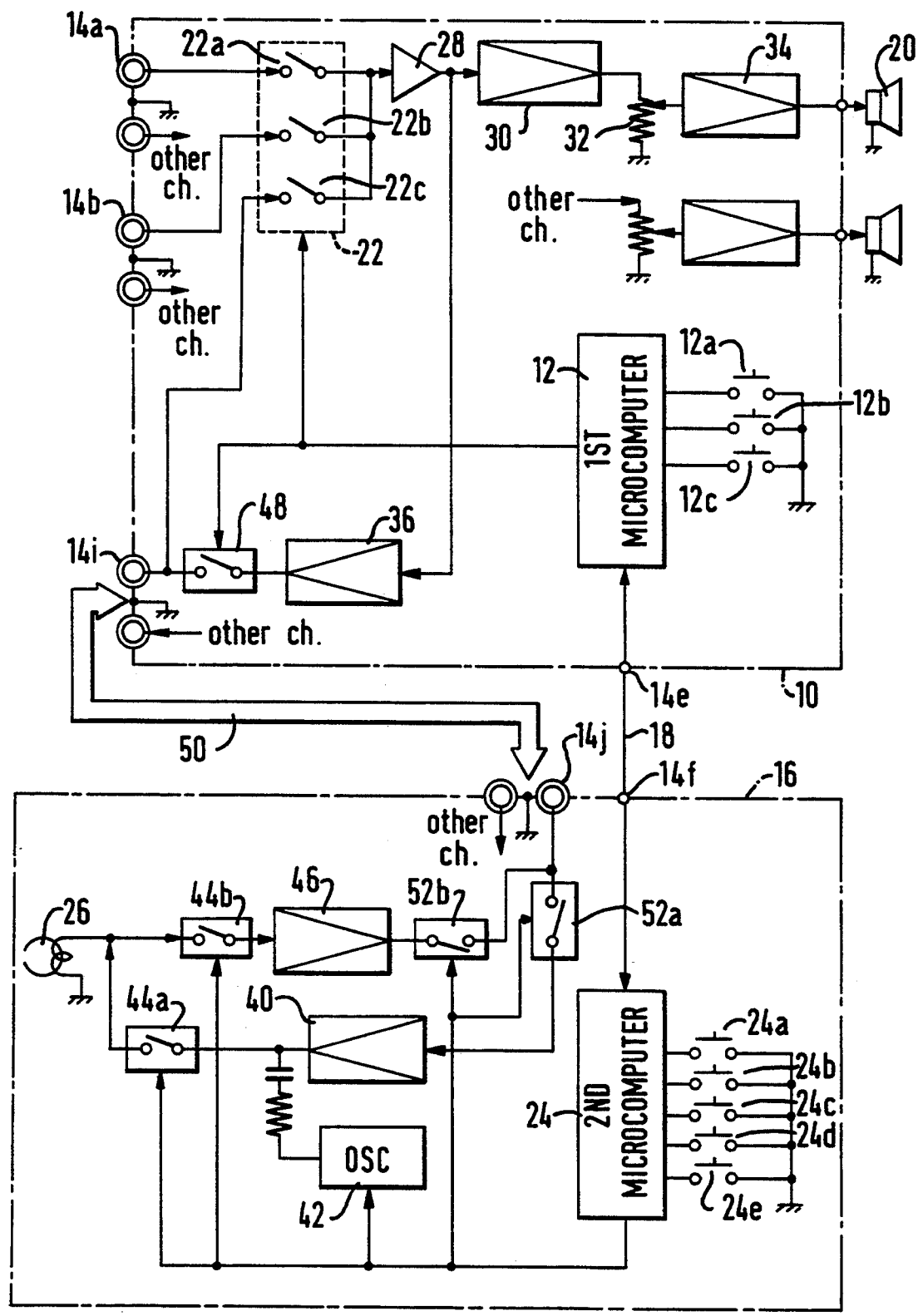
FIG. 2 is a block diagram showing a first embodiment of an input/output switching circuit according to the invention.

The invention will be described in detail with reference to the FIGS. 2 and 3. In the drawings, reference numerals or letters used in FIG. 1 will be used to designate like or equivalent elements for simplicity of explanation. FIG. 2 shows a block diagram of a first embodiment of the input/output switching circuit in which a microcomputer is included in each of an amplifier unit and a tape deck unit.

An amplifier unit 10 includes a first microcomputer 12 for selectively switching the input signals of jacks 14a, 14b and 14i. First microcomputer 12 detects and determines the mode of a tape deck unit 16, through keyswitches 12a through 12c. These nodes include, for example, record and playback. The tape deck unit 16 passes control signal to first microcomputer 12, through a communication line 18 connected between jacks 14e and 14f, for selecting signals output through a speaker 20 via an input selector 22. Additionally, first microcomputer 12 transmits the switching mode of the input selector 22 to tape deck unit 16 through communication line 18.

The tape deck unit 16 includes a second microcomputer 24 for controlling a tape drive mechanism (not shown) which drives the cassette tape and for executing the signal selection of a record/playback head 26. The second microcomputer 24 controls the cassette mechanism according to the mode of keyswitches 24a through 24e, and executes the selection of either recording signals to record/playback head 26 or the playback of recorded signals. Moreover, second microcomputer 24 detects and determines the mode of amplifier unit 10 according to control data output from first microcomputer 12 to second microcomputer 24 through the communication line 18.

When tape deck unit 16 is selected at the amplifier unit 10, first microcomputer 12 automatically passes the appropriate control data to second microcomputer 24 to place tape deck unit 16 into playback mode. When another input is selected at amplifier unit 10, microcomputers 12 and 24 automatically place the tape deck unit 16 into a stop mode. Additionally second microcomputer 24 transmits control data to amplifier unit 10 through the communication line 18 indicating the mode of the cassette mechanism (playback, fast forward, rewind, stop, record) in tape deck unit 16.

When the input keyswitch 12a of first microcomputer 12 is closed, first microcomputer 12 closes a first switch 22a and opens second and third switches 22b and 22c of the input selector 22. Since first switch 22a is closed, input audio/video signals from the jack 14a are transmitted to a buffer 28. These audio/video signals are input to a preamplifier 30 from buffer 28 and subsequently output from speaker 20 via a volume controller 32 and a power amplifier 34. The output of buffer 28 is also transmitted to tape deck unit 16 through a buffer amplifier 36 as an input signal.

The output of the buffer amplifier 36 is supplied to a jack 14i through a switch 48 which is controlled by first microcomputer 12. That is, jack 14i is provided in place of the jacks 14c and 14d of FIG. 1 and the switch 48 is added to the design. Jack 14i is also connected to the input of third switch 22c of the input selector 22. When third switch 22c is closed by first microcomputer 12, switch 48 is open, and vice verse.

Thus, switch 48 transmits the output of buffer amplifier 36 to jack 14i when either one of first and second switches 22a and 22b is closed and third switch 22c is open. On the other hand, jack 14i is connected to buffer 28 through third switch 22c, when the third switch 22c is closed and switch 48 is open. In this state, a signal on jack 14i, that is, a playback signal obtained in tape deck unit 16 as described later, is applied to speaker 20.

The signal applied to jack 14i from buffer amplifier 36 through switch 48 is supplied to tape deck unit 16 through a common connection cable 50. The common connection cable 50 is connected to a jack 14j on tape deck unit 16 in place of the jacks 14g and 14h of FIG. 1. The signal input to the jack 14j is supplied to a recording amplifier 40 through a first amplifier circuit switch 52a which is controlled by second microcomputer 24.

If tape deck unit 16 is in the recording mode second microcomputer 24 closes first amplifier circuit switch 52a and a first head circuit switch 44a. Thus, the signal applied to jack 14i through the common connection cable 50 from amplifier unit 10 is supplied to a record/playback head 26 through first amplifier circuit switch 52a, recording amplifier 40 and first head circuit switch 44a. A bias signal of a bias oscillator 42 is added to the signal amplified by recording amplifier 40 before being applied to record/playback head 26.

At this time, first microcomputer 12 transmits control data indicating the closed state of first switch 22a and the open states of second and third switches 22b and 22c to second microcomputer 24 of the tape deck unit 16 through the communication line 18.

Also, when the keyswitch 12c of amplifier unit 10 is closed, first microcomputer 12 closes third switch 22c and opens first and second switches 22a and 22b of input selector 22 and switch 48. If tape deck unit 16 is in playback mode, playback signals from record/playback head 26 are applied to jack 14j through a second head circuit switch 44b, a playback amplifier 46 and a second amplifier circuit switch 52b. Second head circuit switch 44b and second amplifier circuit switch 52b are controlled by second microcomputer 24 in the playback mode. That is, two circuits connected in parallel between the jack 14j and record/playback head 26 are oppositely activated by second microcomputer 24.

The playback signal applied to jack 14j is supplied to jack 14i of the amplifier unit 10 through the common connection cable 50. The closed states of second head circuit switch 44b and second amplifier circuit switch 52b, and the open states of first head circuit switch 44a and first amplifier circuit switch 52a are detected and determined by first microcomputer 10 according to the above-mentioned communication through the communication line 18. Thus, first microcomputer 12 closes third switch 22c of input selector 2Ù and opens switch 48 in the playback mode, and the playback signal transmitted through the common connection cable 50 to the jack 14i of amplifier unit 10 is applied to speaker 20.

The first embodiment of the present invention can carry out the mutual transmission of signals between the amplifier unit and the tape deck unit by using the common connection cable. Thus, the construction of the input/output switching circuit according to the invention is simplified over the prior art device of FIG. 1.

Figure 3:
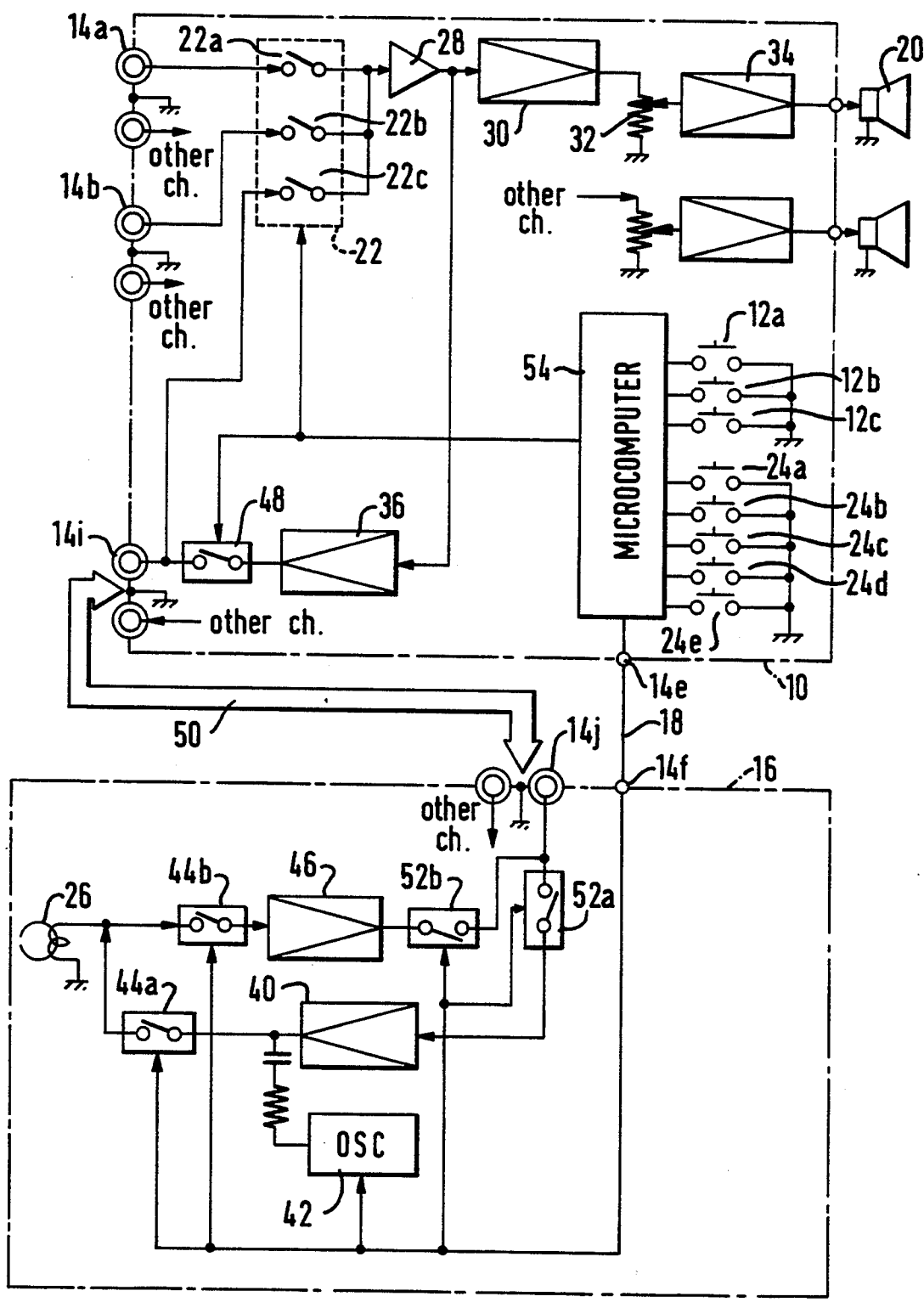
FIG. 3 is a block diagram showing a second embodiment of an input/output switching circuit according to the invention.

In a second preferred embodiment illustrated in FIG. 3, microcomputers 12 and 22 may be replaced by a single microcomputer 54. The single microcomputer 54 can be included in amplifier unit 10 as shown in FIG. 3, or otherwise can be placed in tape deck unit 16. In either configuration, single microcomputer 54 is connected to the other unit through communication line 18. Further, single microcomputer 54 is coupled to the keyswitches 12a to 12c and keyswitches 24a to 24e.

As described above, the present invention can provide an extremely preferable input/output switching circuit.

while there have been illustrated and described what are at present considered to be preferred embodiments of the invention it will be understood by those skilled in the art that various changes and modifications may be made, and equivalents may be substituted for elements thereof without departing from the true scope of the present invention.

In addition, many modifications may be made to adapt a particular situation or material to the teaching of the present invention without departing from the central scope thereof. Therefore, it is intended that the invention not be limited to the particular embodiment disclosed as the best mode contemplated for carrying out the invention, but that the invention include all embodiments falling within the scope of the appended claims.

What is claimed is:

1. A switching circuit for interconnecting a first and a second separate audio/video component, the second audio/video component having selectable operating modes of record and playback, the switching circuit comprising:
   a first switch associated with the first audio/video component and having setable switching modes of record and playback;
   a first terminal associated with the first audio/video component and coupled with the first switch for receiving audio/video signals;
   a second terminal associated with the first audio/video component and coupled with the first switch;
   a second switch associated with the first audio/video component and having setable switching modes of record and playback, said second switch coupled with the second terminal;
   a first circuit associated with the first audio/video component for interconnecting the first and second switches and for receiving audio/video signals;
   a first microprocessor associated with the first audio/video component and coupled with the first switch and the second switch for detecting a selection of the operating mode of the second audio/video component and for setting the switching mode of the first switch and the second switch according to the detected selection;
   a third terminal associated with the second audio/video component;
   a single cable having first and second ends, the first end coupled with the first terminal and the second end coupled with the third terminal to interconnect the first and second audio/video components;
   a third switch associated with the second audio/video component and having setable switching modes of record and playback, the third switch coupled with the third terminal;
   a second circuit associated with the second audio/video component and coupled with the third switch for receiving audio/video signals;
   a third circuit associated with the second audio/video component and coupled in parallel with the second circuit, the third circuit coupled with the third switch for sending audio/video signals; and a second microprocessor, associated with the second audio/video component and coupled with the third switch, for detecting a selection of the operating mode of the second audio/video component and for controlling the switching mode of the third switch according to the detected selection;

wherein, when the first, second, and third switches are set in the record switching mode, the first terminal is coupled with the second circuit through the first switch, first circuit, second switch, second terminal, single cable, third terminal, and third switch, whereby audio/video signals received at the first terminal are transmitted to and received by the second circuit; and wherein, when the first, second, and third switches are set in the playback switching mode, the third circuit is coupled with the first circuit through the third switch, third terminal, single cable, second terminal, and first switch, whereby audio/video signals sent by the third circuit are transmitted to and received by the first circuit;

whereby bidirectional transmission of audio/video signals between the first and second audio/video components occurs over the single cable.

2. A switching circuit according to claim 1, wherein the first circuit comprises a means for amplifying audio/video signals.

3. A switching circuit according to claim 1, wherein the second circuit comprises a means for recording audio/video signals.

4. A switching circuit according to claim 1, wherein the third circuit comprises a means for reproducing recorded audio/video signals.

5. A switching circuit for interconnecting a first and a second audio/video component, the second audio/video component having selectable operating modes of record and playback, the switching circuit comprising:

a first switch associated with the first audio/video component and having setable switching modes of record and playback;

a first terminal associated with first audio/video component and coupled with the first switch for receiving audio/video signals;

a second terminal associated with first audio/video component and coupled with the first switch;

a second switch associated with first audio/video component and having setable switching modes of record and playback, the second switch coupled with the second terminal;

a first circuit, associated with first audio/video component, for interconnecting the first and second switches and for receiving audio/video signals;

a third terminal associated with second audio/video component;

a single cable having first and second ends, the first end coupled with the first terminal and the second end coupled with the third terminal to interconnect the first and second audio/video components;

a third switch associated with second audio/video component and having setable switching modes of record and playback, the third switch coupled with the third terminal;

a second circuit associated with second audio/video component and coupled with the third switch for receiving audio/video signals;

a third circuit associated with second audio/video component and coupled in parallel with the second circuit, the third circuit coupled with the third switch for sending audio/video signals; and a microprocessor associated with the first audio/video component and coupled with the first, second, and third switches for detecting a selection of the operating mode of the second audio/video component and for controlling the switching modes of the first, second, and third switches according to the detected selection;

wherein, when the first, second, and third switches are set in the record switching mode, the first terminal is coupled with the second circuit through the first switch, first circuit, second switch, second terminal, single cable, third terminal, and third switch, whereby audio/video signals received at the first terminal are transmitted to and received by the second circuit; and wherein, when the first, second, and third switches are set in the playback switching mode, the third circuit is coupled with the first circuit through the third switch, third terminal, single cable, second terminal, and first switch, whereby audio/video signals sent by the third circuit are transmitted to and received by the first circuit;

whereby bidirectional transmission of audio/video signals between the first and second audio/video components occurs over the single cable.

6. A switching circuit according to claim 5, wherein the first circuit comprises a means for amplifying audio/video signals.

7. A switching circuit according to claim 5, wherein the second circuit comprises a means for recording audio/video signals.

8. A switching circuit according to claim 5, wherein the third circuit comprises a means for reproducing recorded audio/ video signals.

* * * * *